July 11, 1939.     B. M. CARTER     2,165,957
METHOD OF PRODUCING ARSENIC ACID BY REACTION OF NITRIC ACID
AND ARSENIOUS OXIDE, WITH RECOVERY OF NITRIC ACID
Filed May 22, 1937
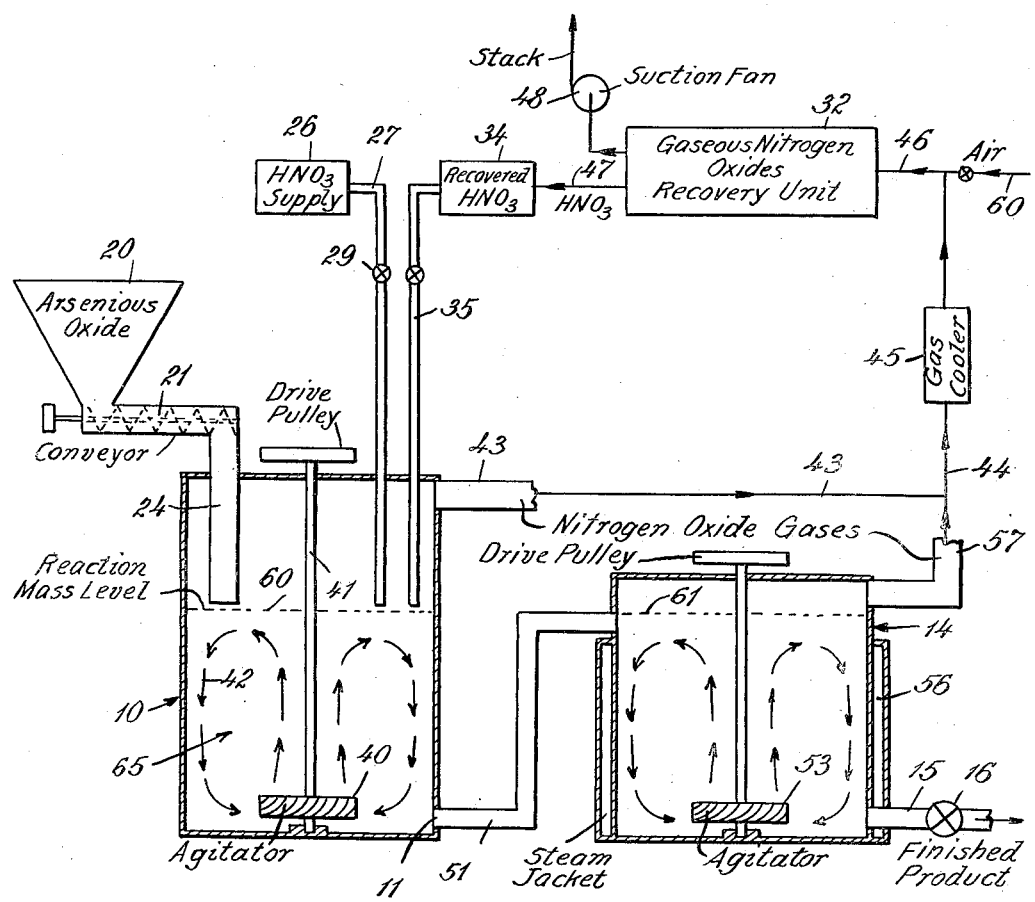
INVENTOR
Bernard M. Carter
BY
ATTORNEY Patented July 11, 1939

2,165,957

UNITED STATES PATENT OFFICE 2,165,957

METHOD OF PRODUCING ARSENIC ACID BY REACTION OF NITRIC ACID AND ARSENIOUS OXIDE, WITH RECOVERY OF NITRIC ACID

Bernard M. Carter, Montclair, N. J., assignor to General Chemical Company, New York, N. Y., a corporation of New York Application May 22, 1937, Serial No. 144,284

2 Claims. (Cl. 23—144)

This invention relates to improvements in the recovery of nitrogen oxide gases in an absorption system including a plurality of towers connected in series and through which the nitrogen oxide gases admixed with controlled quantities of air are passed successively and contacted with suitable liquid, such as dilute nitric acid, to form nitric acid, in which form the nitrogen oxide gases fed into the system are recovered.

The improvements constituting the invention have particular application to the recovery of nitrogen oxide gases in a system including a nitrogen oxide gas recovery unit and an associated reaction zone in which nitric acid is employed as a major reagent and there are formed nitrogen oxide gases which must, of economic necessity, be recovered and reconverted to nitric acid. One instance in which nitric acid is used as a major reagent and large quantities of recoverable nitrogen oxide gases are produced is the reaction of nitric acid and arsenious oxide in which substantial volumes of nitrogen oxide are generated. Arsenic acid is also formed. For convenience, the present improvements will be described in connection with a nitric acid-arsenious oxide reaction as a type of reaction forming large amounts of nitrogen oxide gases which must be reconverted to nitric acid.

In the usual prior commercial methods for carrying out reaction of nitric acid and arsenious oxide, arsenious oxide and nitric acid are fed separately or simultaneously into a relatively large reaction vat or chamber until a sufficient quantity of raw materials have been introduced into the reaction chamber to make up the charge. The reaction mass is agitated during addition of the raw materials and also throughout the relatively long subsequent interval during which reaction of acid and oxide is completed. The time required to complete reaction of a batch may vary from say 16 to 72 hours depending upon the size of the reaction chamber. Over the course of the entire reaction, large amounts of gaseous oxides of nitrogen are evolved, and for economic reasons it is necessary to recover such nitrogen oxides and reconvert the same to nitric acid. Accordingly, the gases are withdrawn from the reaction chamber, mixed with the necessary amount of air, and introduced into absorption system in which the initial nitrogen oxide gases are recovered as nitric acid. Such nitric acid, together with a fresh supply to make up for the amount of acid lost, is utilized to react with a further quantity of arsenious oxide. At the end of such reaction cycle, the batch is balanced with acid or oxide as required, and the arsenic acid also formed is withdrawn from the reaction zone. The procedure is a batch operation.

In the commercial batchwise procedure of reacting nitric acid and arsenious oxide, many practical operating difficulties are involved. The principal difficulties encountered arise out of slowness and irregularity of the nitric acid-arsenious oxide reaction. In its initial stages, the reaction takes place with great rapidity and intensity and large volumes of gaseous oxides of nitrogen are evolved often with almost explosive violence. Generation and especially intermittent generation of large quantities of gas causes excessive foaming which may require temporary cessation of introduction of the raw materials into the reaction kettle for a time interval long enough to permit the foaming to subside or necessitate use of some complicated procedure, such as spraying the surface of the reaction mass with reaction liquor, to break down the foam and effect liberation of the bubble forming gases.

However, in addition to the above difficulty, a much more important consideration in the nitric acid-arsenious oxide reaction is the recovery as nitric acid of the gaseous oxides of nitrogen. While at the beginning of the reaction, large volumes of gaseous oxides of nitrogen are given off, in later stages reaction velocity drops off rapidly and during the major portion of the later phases of the reaction only small quantities of nitrogen oxide gases are formed. For any given reaction chamber unit, the recovery system must be designed large enough to recover the gaseous oxides of nitrogen at the time the maximum volume of gas is being given off. As indicated, in commercial operations, time intervals ranging from say 16 to 72 hours are often required to complete a batch nitric acid-arsenious oxide reaction. Since evolution of gas is at a maximum during only the initial few hours of the total time necessary to react the nitric acid and the arsenious oxide, it will be seen that during the greater part of the batch cycle, with respect to the quantity of nitrogen oxide gases handled, the recovery system is working at much less than the designed capacity.

It will be understood that since recovery of nitrogen oxides as nitric acid includes oxidation of lower oxides evolved in the nitric acid-arsenious oxide reaction, air must be admixed with the nitrogen oxide gases. This is usually done by means of an air inlet in the nitrogen oxide gas main just ahead of the recovery towers. In commercial practice, flow of gas through the recovery unit is effected by a suction fan the inlet side of which is connected to the gas outlet of the last tower of the series. Such fan is designed to operate at constant speed and consequently at all times draws a substantially constant volume of gas through the towers. In the prior procedure, as the quantity of nitrogen oxide gases evolved in the nitric acid-arsenious oxide reaction zone drops off (almost to zero at the end of the reaction) a correspondingly greater amount of air is drawn into the recovery unit through the air inlet. Alternatively, when excessively large volumes of nitrogen oxide gases are generated in the nitric acid-arsenious oxide reaction zone, the quantity of air drawn into the system through the inlet is correspondingly decreased. The result is a more or less continuous fluctuation of the composition of the gas mixture entering the recovery unit. Accordingly, it will be seen the constantly varying changes in volume of nitrogen oxide gas as such fed to the recovery unit and variations in composition of the gas mixture entering the recovery system prevent efficient operation of the recovery system to such an extent that substantial amounts of nitrogen oxides escape with the tail gases of the last absorption tower thus resulting in substantial losses of nitric acid. Another objection incidentally involved is that at the beginning of reaction heat is generated more rapidly than required to offset radiation losses and maintain desirable reaction temperature, and consequently the rate of addition of reactants must be slowed down or the batch chilled by addition of cold water. In the later phases of the reaction not enough heat is evolved. As the reaction proceeds so little heat is generated that the temperature may fall and seriously reduce the rate of reaction, thus requiring provision of means for heating the reaction and consumption of heat for this purpose.

The principal object of the invention is to provide procedure for overcoming the above-mentioned difficulties encountered in connection with efficient operation of the recovery system, and to this end the invention aims to provide a method by which there may be supplied to the nitrogen oxide recovery system a stream of nitrogen oxide gas and air of substantially constant volume and composition. A more particular object of the invention lies in provision of a method in which, in connection with a nitric acid-arsenious oxide reaction, there may be supplied to the gas recovery unit a stream of nitrogen oxide gas and air of substantially constant volume and composition. The invention aims to eliminate pulsations in flow of nitrogen oxide gas as such and consequent variations in composition of gas to the recovery system, and in this way provide for continuous operation of the recovery system at maximum efficiency with the important result that loss of nitrogen oxide gases is decreased. Another important accomplishment resulting from continuous operation of the gas recovery unit at maximum efficiency is that, for reasons more apparent from the following discussion of the invention, greater quantities of reactants, such as nitric acid and arsenious oxide, may be fed into and reacted in a given reaction chamber unit, in this way making possible substantially increased output of such given reaction chamber as compared with the output of the same unit when operated according to prior practice.

In accordance with the invention it has been found that there may be supplied to the nitrogen oxide gas recovery unit a stream of nitrogen oxide gas and air of substantially constant volume and composition by carrying out the nitric acid and arsenious oxide reaction in a way presently to be described. The objects, advantages and details of operation of the process of the invention may be more clearly understood from a consideration of the following description taken in connection with the accompanying drawing illustrating, partly diagrammatic and partly in section, apparatus which may be employed.

Referring to the drawing, 10 indicates a closed nitric acid-arsenious oxide reaction chamber or vat provided near the bottom with a discharge opening 11. Flow of liquid through opening 11 is regulated by the rate of withdrawal of liquid from reaction chamber 14 through discharge pipe 15 controlled by valve 16.

A supply of arsenious oxide is maintained in a bin 20 and fed by screw conveyor 21 into the upper end of feed pipe 24, the lower end of which opens into chamber 10. Fresh nitric acid is introduced into the reaction chamber from a tank 26 thru pipe 27 having a control valve 29. Nitric acid formed in the gaseous oxides of nitrogen recovery system 32 may be run from storage tank 34 through pipe 35 into the reaction chamber.

Chamber 10 is provided near the bottom with an agitator 40 keyed to a rotatable drive shaft 41. Any suitable agitator may be employed although it is preferred to use an agitator of the type designed to cause the mass in the chamber to flow in a general upward direction in the central part of the chamber and downwardly in the vicinity of the circumference, somewhat in the fashion indicated by the arrow 42. Provision may also be made for introduction of air into the mass in chamber 10, such air providing agitation of the mass and oxygen used in the recovery unit to oxidize lower oxides of nitrogen.

The gaseous oxides of nitrogen evolved in chamber 10 during the reaction discharge into pipe 43, flow thence through mixing conduit 44, gas cooler 45 and mixing conduit 46 into the recovery system 32. It will be understood the recovery system is of standard construction and includes a plurality of absorption towers connected in series and operated so as to absorb gaseous oxides of nitrogen and form nitric acid which is discharged through pipe 47 into storage tank 34. Flow of a constant volume of gas through the recovery unit is maintained by a fan 48, the suction side of which is connected to the gas outlet of the last tower in the recovery unit.

During normal operation, liquor flows out of the bottom of chamber 10, through pipe 51 into the upper end of second reaction chamber 14, preferably equipped with an agitator 53, similar to agitator 40, and a steam jacket 56. Also air may be introduced into chamber 14 for the same purposes as in chamber 10. Gaseous oxides of nitrogen evolved in chamber 14 flow through outlet pipe 57 and mixing conduit 44 into cooler 45. Finished liquor runs out of the system from chamber 14 through pipe 15.

To start operation, valve 16 in reaction chamber 14 discharge pipe 15 may be closed and the system filled with liquor reaction product of a previous operation. Where the principles of the invention are made use of in connection with a nitric acid-arsenious oxide reaction, such liquid product is arsenic acid. Hence, in the present example, arsenic acid is introduced in quantity sufficient to raise the liquor mass in the system to approximately the levels of dotted line 60 in chamber 10 and dotted line 61 in chamber 14.

The concentration of the fresh nitric acid in tank 26 may be about 40-42° Bé. A supply of arsenious oxide, for example crude dust chamber arsenious oxide, white arsenic, or any suitable commercially obtainable arsenious oxide, may be maintained in bin 20 by apparatus not shown. Valve 29 in nitric acid supply pipe 27 is adjusted and the rate of rotation of screw conveyor 21 is controlled so as to introduce into reaction chamber 10 substantially reacting quantities of arsenious oxide and nitric acid. On introduction of acid and oxide, reaction takes place, gaseous oxides of nitrogen are evolved and flow through pipes 43, 44, cooler 45 and conduit 46 into the recovery system 32. For most efficient nitrogen oxide recovery, the amount of water introduced into the last tower of the recovery system is preferably such that the concentration of the nitric acid formed and flowed into tank 34 is of concentration of about 28-30° Bé. Since in the present process, recovery of oxides of nitrogen may be as high as 90% and upwards, only a relatively small amount of fresh nitric acid from tank 26 need be used. After operations are under way, the average concentration of the nitric acid introduced into the reaction chamber through pipes 27 and 35 may be around say 32-34° Bé.

During reaction of the nitric acid and arsenious oxide in chamber 10 it is preferable to constantly agitate and keep the mass moving in the general way indicated by arrows 42. While at initiation of operations, the liquor in chamber 10 may be arsenic acid of a previous process, after operations have been started and are proceeding normally, the body 65 in chamber 10 comprises at least partially reacted nitric acid and arsenious oxide. In the preferred mode of operation, however, liquid body 65 comprises material in which the reaction has proceeded say upwards of 80% of completion, and the expression—substantially reacted nitric acid and arsenious oxide—is intended to designate relatively liquid material which has reacted about 80% or more to completion. As will presently appear, the concentration of liquid body 65 is maintained not less than about 65° Bé. and preferably not less than about 70° Bé.

Continuous introduction of arsenious oxide from bin 20 and nitric acid from tanks 26 and 34 in reacting proportions, preferably accompanied by continuous agitation speeds up the nitric acid-arsenious oxide reaction, keeps the reaction rate at a maximum, and tends to eliminate excessive and irregular foaming on the surface of the reaction mass. Nitrogen oxide gases are generated in chamber 10 in approximately constant volume and pass at temperatures of about 220° F. through outlet pipes 43 and 44 into gas cooler 45.

The amount of water introduced into reaction chamber 10, controlled by regulating the amount of water used in the recovery system 32, is such that the concentration of the mass of substantially reacted nitric acid and arsenious oxide constituting the relatively liquid body 65 is not less than about 65° Bé. In usual operations carried on at the acid concentrations mentioned, the concentration of fluid body 65 should be and is preferably not less than about 70° Bé. This feature of operation is of importance in that where the concentration of the fluid body 65 is not less than about 65° Bé., the volume of ingredients in chamber 10 is small enough so that the entire mass may be constantly maintained at reaction temperature, e. g. 210° F., by the heat generated by the reaction, thus making the entire nitric acid-arsenious oxide reaction in chamber 10 exothermic and self-sustaining. Thus, the process of the invention is such as to effect continual liberation of constant quantities of heat, in this way avoiding the necessity of employing steam-jacketed equipment for the main reaction chamber 10 and consequent consumption of extraneous heat.

In the preferred procedure, the time interval during which a given amount of reactant materials is retained in chamber 10 is regulated so that the nitric acid-arsenious oxide reaction is upwards of say 80% complete by the time a given quantity of liquid is discharged from chamber 10 through outlet 11. Such regulation may be readily obtained by controlling the rate of feed of raw materials to and the rate of withdrawal of liquid reaction products from chamber 10. Under usual optimum conditions, reaction is generally about 85-90% finished in chamber 10. About the same time interval is required to effect completion of the last 20 to 10% of the nitric acid-arsenious oxide reaction as is needed to carry out the initial 80 to 90% of complete reaction. Hence, operations are conducted (by controlling rate of withdrawal of liquor from chamber 14 through valve 16) so that by the time reaction in chamber 10 progresses to about 80 to 90% completion, the liquor is run by gravity continuously through pipe 51 into the second reaction chamber 14 which may be of size sufficient to hold a volume of liquor equal to that in chamber 10.

In chamber 14, reaction of incompletely reacted acid and oxide progresses normally at constantly decreasing rate. To hasten completion of reaction, the liquor in chamber 14 may be constantly agitated similarly as in chamber 10 and sufficient extraneous heat may be supplied by means of steam jacket 56 to maintain the liquor in chamber 14 at temperatures of more than about 190° F. In chamber 14, further quantities of gaseous oxide of nitrogen are liberated and flow through pipe 57 and mixing pipe 44 into gas cooler 45. Although the volume of gases generated in chamber 14 is substantially less than the volume of gases generated in chamber 10, and the gases of chamber 14 may be slightly lower in oxides of nitrogen and slightly higher in water vapor the rate of generation of the gases in chamber 14 is relatively constant so that, after mixing of such gases from pipe 57 with the gases from pipe 43 in mixing conduit 44 the volume and composition of the gas introduced into gas cooler 45 from pipe 44 is substantially the same throughout operation of the process. The gases fed into the gas cooler are understood to consist of nitric oxide, nitrous anhydride, nitrogen tetroxide, and water vapor, and in the present method the composition of the gas rarely varies to any appreciable extent. In cooler 45, the gases are cooled to about 120° F. to hasten oxidation in recovery unit 32.

It will be understood that since recovery as nitric acid requires oxidation of the lower oxides evolved in the nitric acid-arsenious oxide reaction, air must be admixed with the nitrogen oxide gases at some point prior to introduction of such gases into the oxidation towers. It should be appreciated the quantity of air needed should be in direct proportion to quantity of nitrogen oxides, so as to avoid either deficiency of oxygen on the one hand or excessive dilution on the other, either of which will result in inefficient operation of recovery system both with respect to capacity of nitrogen oxide gases as such handled and loss of nitrogen oxides. Air is drawn into the system through an inlet 60. As indicated previously, fan 48 draws a given constant volume of gas through the recovery unit. If only a deficiency of nitrogen oxide gas from cooler 45 is available a correspondingly greater amount (an excess) of air will be drawn in through inlet 60. Vice versa, if an excess of nitrogen oxide gases from cooler 45 is available, a correspondingly smaller amount (a deficiency) of air will be drawn in through inlet 60. In either situation, the composition of gas fed into recovery unit 32 from mixing pipe 46 is out of balance and efficiency of the recovery unit drops off. Maintenance of the proper ratio of nitrogen oxide gases and air in the recovery system is impossible where, as in the prior practice, the volume of nitrogen oxides leaving cooler 45 is constantly fluctuating. On the other hand, in the present process, evolution of nitrogen oxides is substantially uniform with the result that nitrogen oxide gas of constant volume and composition is discharged from cooler 45. Consequently, the proper ratio of nitrogen oxides and air in pipe 46 can be set with accuracy and maintained. Accordingly, the invention provides a process by means of which there may be supplied to recovery unit 32 a nitrogen oxide-air mixture of constant volume and composition, and the recovery system may be continuously operated at maximum efficiency, thus avoiding the previously described operating difficulties arising from pulsations in volume of nitrogen oxide gas flow to and variations in gas composition entering the recovery system.

Should it be desirable to use air in chambers 10 and 14 as an agitating agent, it will be understood such air takes the place of some of the air which would otherwise be introduced through inlet 60. If air were used in chambers 10 and 14, since the amount of air used for agitating purposes would be constant and the quantity of nitrogen oxide gases generated would also be constant, the volume and composition of the gas mixture discharged from cooler 45 would also be constant. While under optimum operating conditions there is but little variation in the volume of the nitrogen oxide gas discharged from cooler 45 (and in the volume of nitrogen oxide gas as such fed into the recovery system), a plus or minus volume variation of about 10-12% is permissible without foregoing any of the practical advantages of the process. In the present specification and claims, the expression—substantially constant volume—is to be understood as including such variation.

In chamber 14, reaction of incompletely reacted arsenious oxide and nitric acid proceeds to completion, and finished liquid product (arsenic acid) may be continuously withdrawn through pipe 15. With reasonably accurate control of the arsenious oxide and nitric acid feeds to chamber 10, no balancing (i. e. further addition of relatively small amounts of oxide or acid) is necessary in chamber 14. Such a relatively large volume of liquor is at all times present in the system, that should feed of acid or oxide to chamber 10 be temporarily irregular, such irregularity becomes absorbed in the large volume of liquid in the apparatus.

Any reaction irregularities taking place in the system may be noted quickly by rapid temperature changes in the gas discharged from chamber 10 through pipe 43. Under average operating conditions, the gas temperature in pipe 43 just at the point of exit from chamber 10 is normally about 220° F. plus or minus a few degrees. Such temperature is notably sensitive to reaction changes in chamber 10, and hence for example any feed irregularities of acid or oxide may be noted by an almost immediate appreciable drop of gas temperature in pipe 43. Thus, control of operation is relatively simple.

The process of the invention is such as to effect increase of the overall recovery of gaseous oxides of nitrogen. In the present process, nitrogen oxide gas supply to the recovery system is substantially constant with respect to both volume and composition. Experience shows that when these conditions prevail it is possible to operate a given absorption system constantly at maximum efficiency with the result that the amount of nitrogen oxide gases recovered as nitric acid may be increased from the approximate 83-84% of prior practice to about 90-92%.

In previous practice, a given quantity of arsenious oxide and nitric acid was charged into a reaction chamber of given size, and as explained previously it was necessary to design the nitrogen oxide gas recovery unit big enough to handle the maximum volume of nitrogen oxide gases generated, even though during the major portion of the nitric acid-arsenious oxide reaction the amount of gases generated was far below maximum. In the present method, the recovery system is designed to handle a maximum given volume of nitrogen oxide gas as such, but on account of the improved procedure involved in feeding the raw oxide and acid into the reaction chamber, introduction of raw ingredients may be increased and constantly kept at a point where nitrogen oxide gas generation is at the maximum for which the recovery plant is designed. Hence, greater quantities of raw acid and oxide may be fed into a given reaction chamber in a given unit of time with the result that liquid product (arsenic acid) formation may be substantially increased. Experience indicates that practice of the present process makes it possible to introduced into and react in a given reaction chamber nitric acid and arsenious oxide in amount as much as 50% in excess of the quantities chargeable into the same size apparatus but operated in accordance with the prior procedure.

I claim:

1. In the method for reacting nitric acid and arsenious oxide to form arsenic acid with recovery of nitrogen oxides evolved, the steps comprising maintaining in a reaction zone, heated to reaction temperature, a relatively liquid body of at least partially reacted arsenious oxide and nitric acid, continuously feeding into said body solid arsenious oxide and at least a sufficient amount of nitric acid to complete the reaction and continuously effecting reaction of nitric acid and arsenious oxide and relatively steady evolution of nitrogen oxide gas of substantially constant volume and composition, continuously withdrawing said nitrogen oxide gas from said reaction zone, continuously withdrawing from said reaction zone a portion of said liquid body, regulating introduction of nitric acid and arsenious oxide into and withdrawal of liquid body from said zone so as to effect therein reaction of arsenious oxide to not less than about 80% of completion, introducing said portion into a second reaction zone, heated to reaction temperature and therein effecting further reaction of nitric acid and arsenious oxide in liquid phase and accompanying evolution of further quantities of nitrogen oxide gas, continuously mingling such further quantities with said nitrogen oxide gas withdrawn from the first-mentioned reaction zone, continuously introducing the resulting gas mixture into an absorption recovery unit, and recovering nitrogen oxide gases therein.

2. The method of claim 1 in which introduction of nitric acid and arsenious oxide into and withdrawal of liquid body from the first-mentioned reaction zone are regulated to maintain the concentration of the liquid body not less than about 65° Bé.

BERNARD M. CARTER.